(12) United States Patent
Dierberger (10) Patent No.: US 10,914,470 B2
(45) Date of Patent: Feb. 9, 2021

(54) COMBUSTOR PANEL WITH INCREASED DURABILITY

(71) Applicant: United Technologies Corporation, Hartford, CT (US)

(72) Inventor: James A. Dierberger, Hebron, CT (US)

(73) Assignee: Raytheon Technologies Corporation, Farmington, CT (US)

(*) Notice: Subject to any disclaimer, the term of this patent is extended or adjusted under 35 U.S.C. 154(b) by 481 days.

(21) Appl. No.: 14/775,446

(22) PCT Filed: Mar. 13, 2014

(86) PCT No.: PCT/US2014/026267
§ 371 (c)(1),
(2) Date: Sep. 11, 2015

(87) PCT Pub. No.: WO2014/160299
PCT Pub. Date: Oct. 2, 2014

(65) Prior Publication Data
US 2016/0040879 A1    Feb. 11, 2016

Related U.S. Application Data

(60) Provisional application No. 61/782,853, filed on Mar. 14, 2013.

(51) Int. Cl.
*F23R 3/00* (2006.01)
*F23R 3/50* (2006.01)
*F02C 7/18* (2006.01)

(52) U.S. Cl.
CPC .............. *F23R 3/002* (2013.01); *F02C 7/18* (2013.01); *F23R 3/005* (2013.01); *F23R 3/50* (2013.01); *F23R 2900/00005* (2013.01); *F23R 2900/03042* (2013.01); *Y02T 50/60* (2013.01)

(58) Field of Classification Search
CPC .. F23R 3/002; F23R 3/06; F23R 2900/00019; F23R 2900/00005; F23R 2900/03044; F05B 2260/231
See application file for complete search history.

(56) References Cited

U.S. PATENT DOCUMENTS

| | | | |
|---|---|---|---|
| 3,800,864 A * | 4/1974 | Hauser | F01D 25/12 165/47 |
| 3,986,347 A | 10/1976 | Schirmer | |
| 4,012,902 A | 3/1977 | Schirmer | |
| 4,206,865 A * | 6/1980 | Miller | B23P 15/00 228/152 |
| 4,242,871 A | 1/1981 | Breton | |
| 4,380,906 A | 4/1983 | Dierberger | |
| 4,655,044 A | 4/1987 | Dierberger et al. | |
| 4,763,481 A | 8/1988 | Cannon | |
| 5,181,379 A | 1/1993 | Wakeman et al. | |
| 5,233,828 A | 8/1993 | Napoli | |
| 5,261,223 A | 11/1993 | Foltz | |

(Continued)

OTHER PUBLICATIONS

EP search report for EP14774204 dated Feb. 8, 2016.

*Primary Examiner* — Scott J Walthour
*Assistant Examiner* — William L Brezeal
(74) *Attorney, Agent, or Firm* — Getz Balich LLC (57) ABSTRACT

A liner panel for a combustor of a gas turbine engine includes a nominal wall thickness and a thickened wall thickness in the region of a hot spot.

9 Claims, 8 Drawing Sheets

(56) References Cited

U.S. PATENT DOCUMENTS

| | | |
|---|---|---|
| 5,271,220 A | 12/1993 | Holmes et al. |
| 5,279,127 A | 1/1994 | Napoli |
| 5,323,604 A | 6/1994 | Ekstedt et al. |
| 5,413,647 A | 5/1995 | Ablett et al. |
| 5,623,827 A | 4/1997 | Monty |
| 5,630,319 A | 5/1997 | Schilling et al. |
| 5,657,633 A | 8/1997 | Brueggert |
| 6,279,323 B1 | 8/2001 | Monty et al. |
| 6,286,298 B1 | 9/2001 | Burrus et al. |
| 6,314,717 B1 | 11/2001 | Teets et al. |
| 6,374,615 B1 | 4/2002 | Zupanc et al. |
| 6,540,162 B1 | 4/2003 | Johnson et al. |
| 6,655,147 B2 | 12/2003 | Farmer et al. |
| 6,736,338 B2 | 5/2004 | Johnson et al. |
| 7,093,439 B2 | 8/2006 | Pacheco-Tougas et al. |
| 7,093,441 B2 | 8/2006 | Burd et al. |
| 7,363,763 B2 | 4/2008 | Coughlan, III et al. |
| 7,681,398 B2 | 3/2010 | Patel et al. |
| 7,721,548 B2 | 5/2010 | Patel et al. |
| 7,748,221 B2 | 7/2010 | Patel et al. |
| 7,954,325 B2 | 6/2011 | Burd et al. |
| 8,015,829 B2 | 9/2011 | Coughlan, III et al. |
| 8,171,735 B2 | 5/2012 | Mancini et al. |
| 2002/0116929 A1* | 8/2002 | Snyder ............... F23R 3/002 60/740 |
| 2002/0124572 A1 | 9/2002 | Pidcock et al. |
| 2010/0077764 A1* | 4/2010 | Dierberger ......... F23R 3/002 60/754 |
| 2010/0095678 A1 | 4/2010 | Hawie et al. |
| 2010/0229563 A1* | 9/2010 | Woolford ........... F23R 3/002 60/752 |
| 2010/0293957 A1 | 11/2010 | Chen et al. |
| 2011/0023495 A1* | 2/2011 | Bronson ............. F23R 3/06 60/752 |
| 2012/0034075 A1* | 2/2012 | Hsu .................... F01D 9/023 415/178 |
| 2012/0240584 A1 | 9/2012 | Berdou et al. |
| 2012/0304654 A1* | 12/2012 | Melton ............... F23R 3/002 60/746 |

* cited by examiner

COMBUSTOR PANEL WITH INCREASED DURABILITY

This application claims priority to PCT Patent Appln. No. PCT/US14/26267 filed Mar. 13, 2014, which claims priority to U.S. Patent Appln. No. 61/782,853 filed Mar. 14, 2013.

BACKGROUND

The present disclosure relates to a gas turbine engine and, more particularly, to a combustor panel with increased durability.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section is subject to high thermal loads for prolonged time periods and various cooling arrangements are provided. Among these are impingement cooling on a backside and film cooling on a gas side to maintain temperatures within material limits.

Although these cooling arrangements are effective and the combustor section is for the most part, robust and durable, the thermal load may be non-uniform in some locations such that the combustor section may experience differential thermal growth, stress, strain and wear that may negatively effect service life. In some cases, local hot spots are formed in the combustor section.

SUMMARY

A liner panel for use in a combustor of a gas turbine engine according to one disclosed non-limiting embodiment of the present disclosure includes a nominal wall thickness and a thickened wall thickness to at least partially conform to a hot spot.

In a further embodiment of the present disclosure, the nominal wall thickness is about forty 40 mils (0.04"; 1 mm) and the thickened wall thickness is about sixty 60 mils (0.06"; 1.5 mm).

In a further embodiment of any of the foregoing embodiments of the present disclosure, the thickened wall thickness is adjacent to a hole through the heat shield.

In a further embodiment of any of the foregoing embodiments of the present disclosure, the hole is a dilution hole.

In a further embodiment of any of the foregoing embodiments of the present disclosure, the thickened wall thickness includes a film cooling hole therethrough.

In a further embodiment of any of the foregoing embodiments of the present disclosure, the thickened wall thickness is generally forward of the dilution hole.

In a further embodiment of any of the foregoing embodiments of the present disclosure, the thickened wall thickness is generally aft of the dilution hole.

In a further embodiment of any of the foregoing embodiments of the present disclosure, the thickened wall thickness is generally egg-shaped.

In a further embodiment of any of the foregoing embodiments of the present disclosure, the thickened wall thickness is rectilinear in cross-section.

In a further embodiment of any of the foregoing embodiments of the present disclosure, the thickened wall thickness is ramped in cross-section.

A combustor of a gas turbine engine according to another disclosed non-limiting embodiment of the present disclosure includes a heat shield with a nominal wall thickness and a thickened wall thickness to at least partially conform to a hot spot.

In a further embodiment of any of the foregoing embodiments of the present disclosure, the nominal wall thickness is about forty 40 mils (0.04"; 1 mm) and the thickened wall thickness is about sixty 60 mils (0.06"; 1.5 mm).

In a further embodiment of any of the foregoing embodiments of the present disclosure, the thickened wall thickness is adjacent to a dilution hole through the heat shield.

In a further embodiment of any of the foregoing embodiments of the present disclosure, the thickened wall thickness is generally egg-shaped.

In a further embodiment of any of the foregoing embodiments of the present disclosure, the thickened wall thickness is generally forward of a dilution hole.

In a further embodiment of any of the foregoing embodiments of the present disclosure, the thickened wall thickness is generally aft of the dilution hole.

A method of increasing durability of a liner panel in a combustor of a gas turbine engine according to another disclosed non-limiting embodiment of the present disclosure includes thickening a nominal wall thickness to define a thickened wall thickness to at least partially conform to a hot spot.

A further embodiment of any of the foregoing embodiments of the present disclosure includes locating the thickened wall thickness proximate the dilution hole.

A further embodiment of any of the foregoing embodiments of the present disclosure includes directing airflow through the thickened wall thickness toward the dilution hole.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
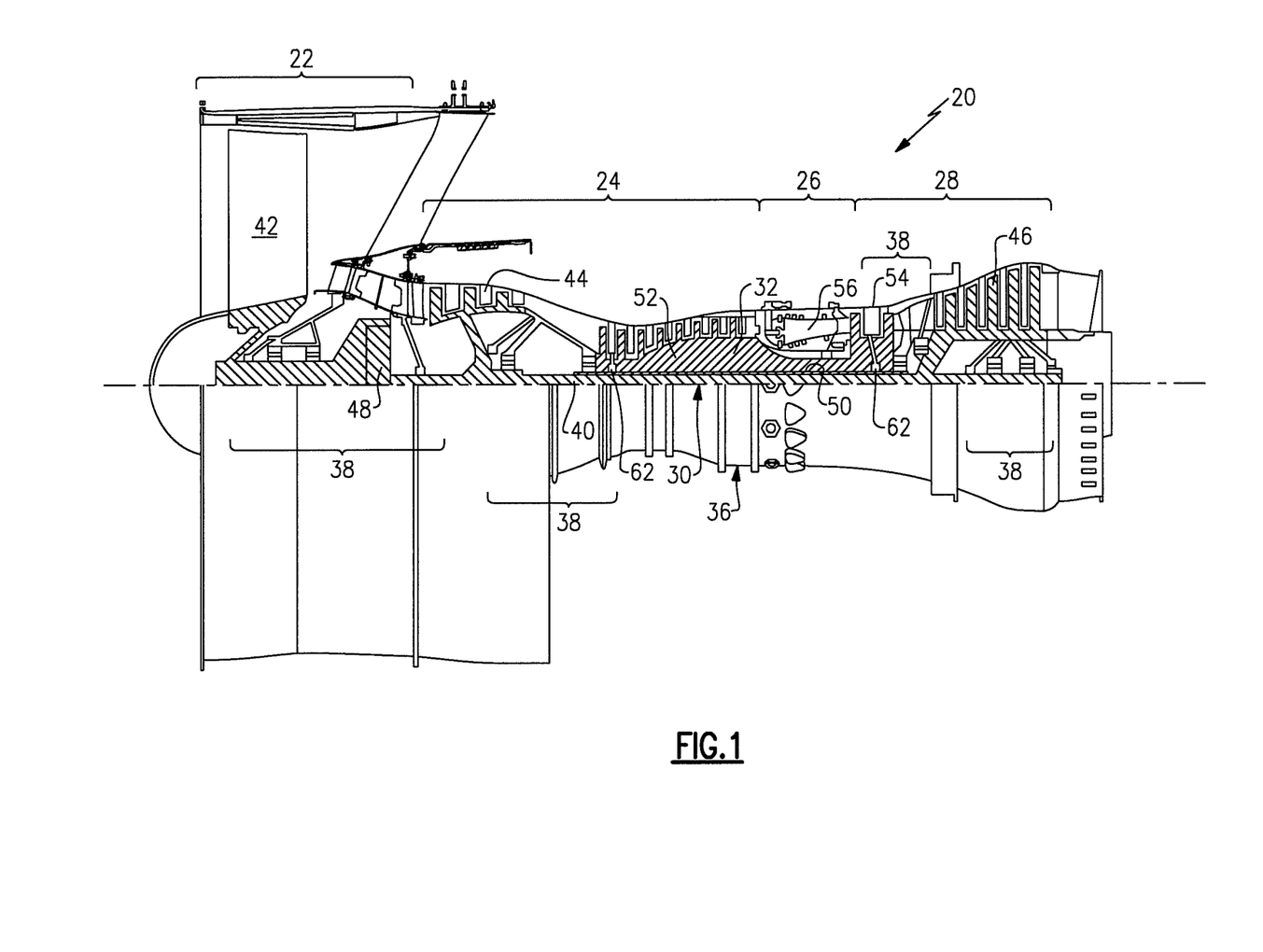
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by compartments 38 within the static structure 36. It should be understood that various compartments 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided along the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade in the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
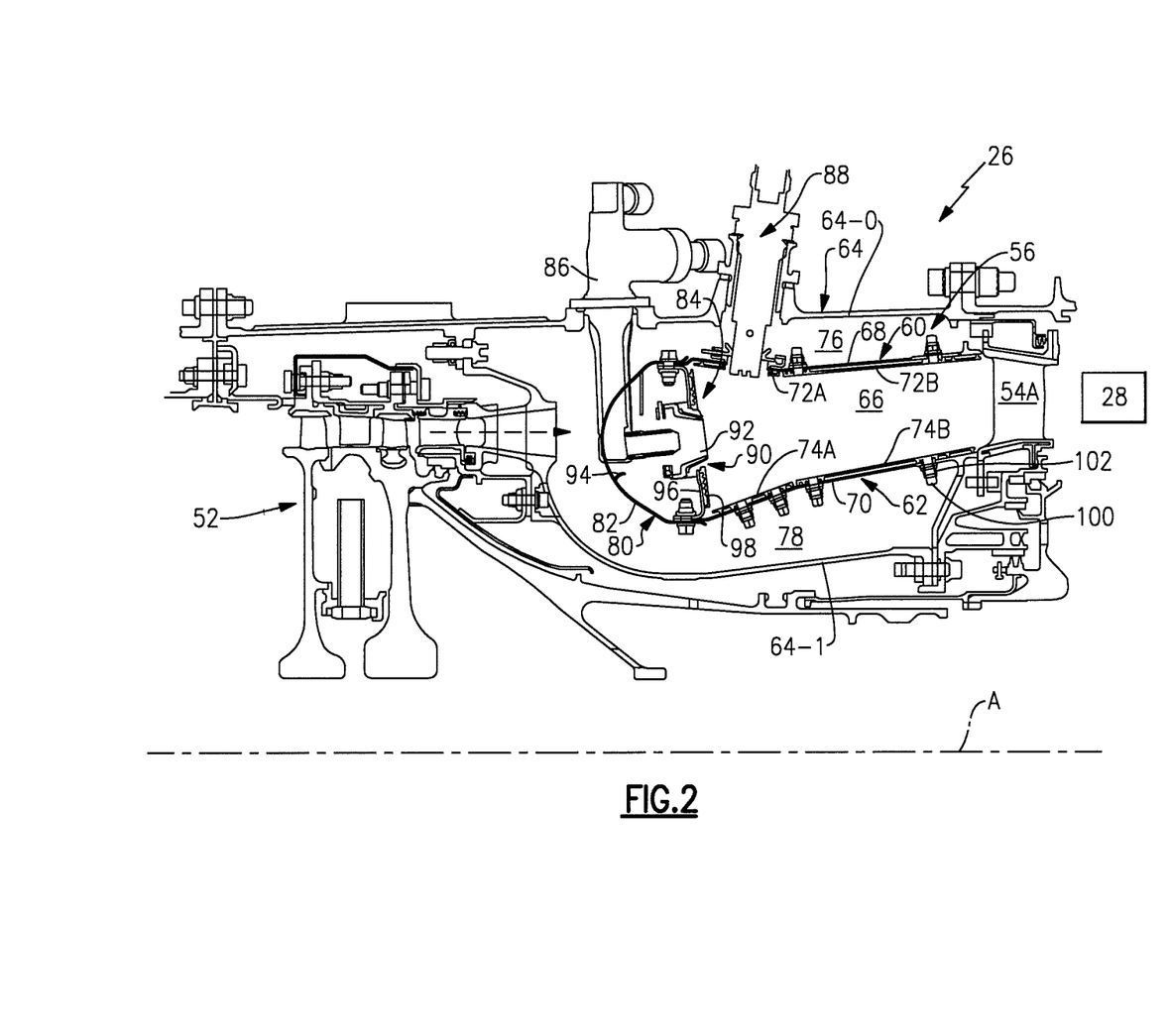
FIG. 2 is a longitudinal schematic sectional view of a combustor section according to one non-limiting embodiment that may be used with the gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array (also shown in FIG. 3). In one disclosed non-limiting embodiment, the liner array includes a multiple of forward heat shields 72A and a multiple of aft heat shields 72B that are circumferentially staggered (FIG. 4) to line the hot side of the outer support shell 68. A multiple of forward heat shields 74A and a multiple of aft heat shields 74B are circumferentially staggered to line the hot side of the inner support shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead heat shields 98 secured to the bulkhead support shell 96 around the central opening 92.

The annular hood 82 extends radially between, and is secured to, the forward most ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Spark energy is provided to the combustor 56 through an igniter 88 that extends through at least one of the multiple of radially outward forward heat shields 72A. The igniter 88 such as a frequency-pulsed igniter provides a continuous spark or other ignition source. The igniter 88 may be located in a multiple of circumferential locations around the combustor 56 in one or more outward forward heat shields 72A.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
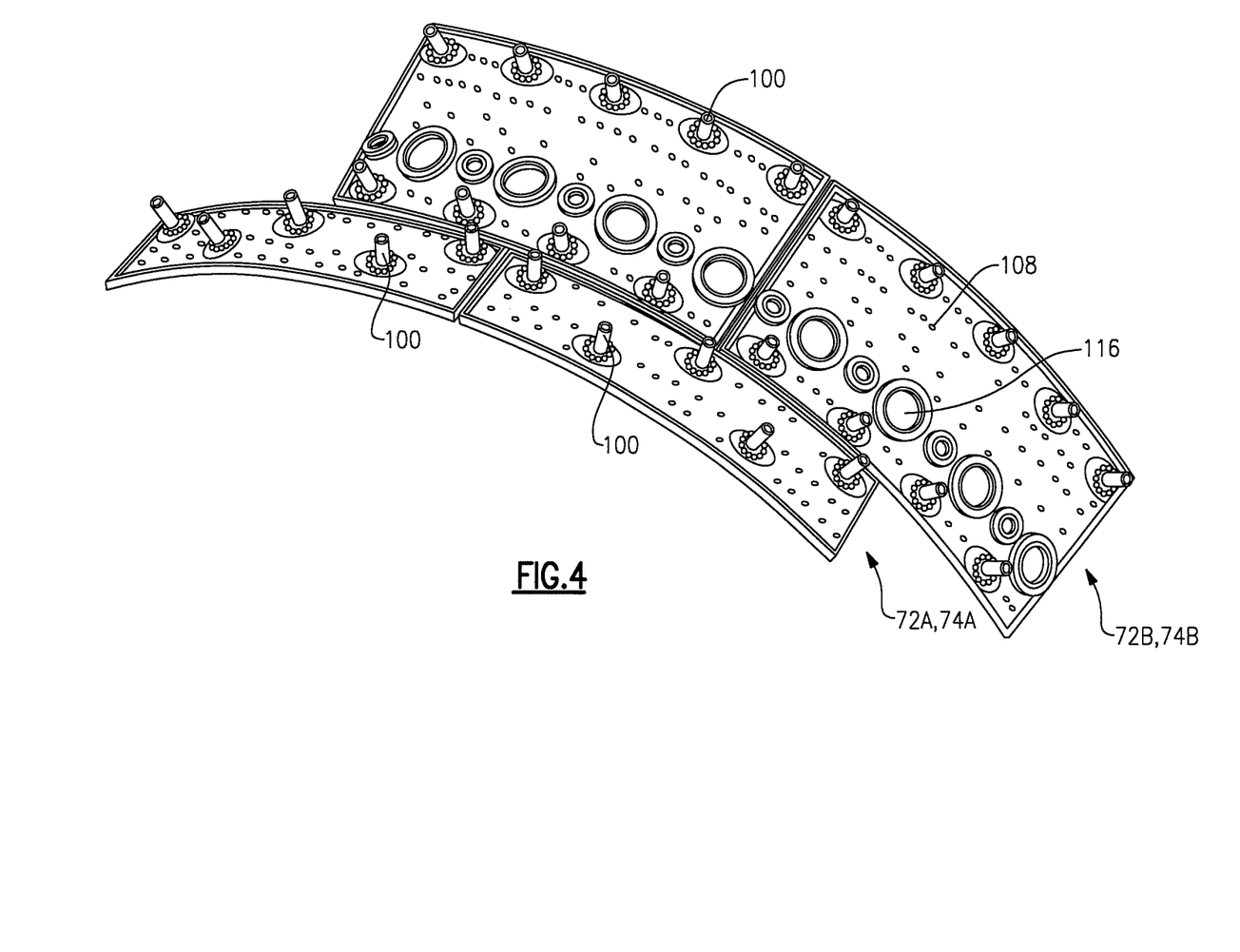
FIG. 4 is an expanded perspective view of a heat shield array from a cold side.

A multiple of studs 100 extend from the heat shields 72, 74 (also shown in FIG. 4). The multiple of studs 100 mount the heat shields 72, 74 to the respective support shells 68, 70 with fasteners 102 such as nuts. That is, the studs 100 project rigidly from the heat shields 72, 74 and through the respective support shells 68, 70 to receive the fasteners 102 at a threaded distal end section thereof.

Figure 3:
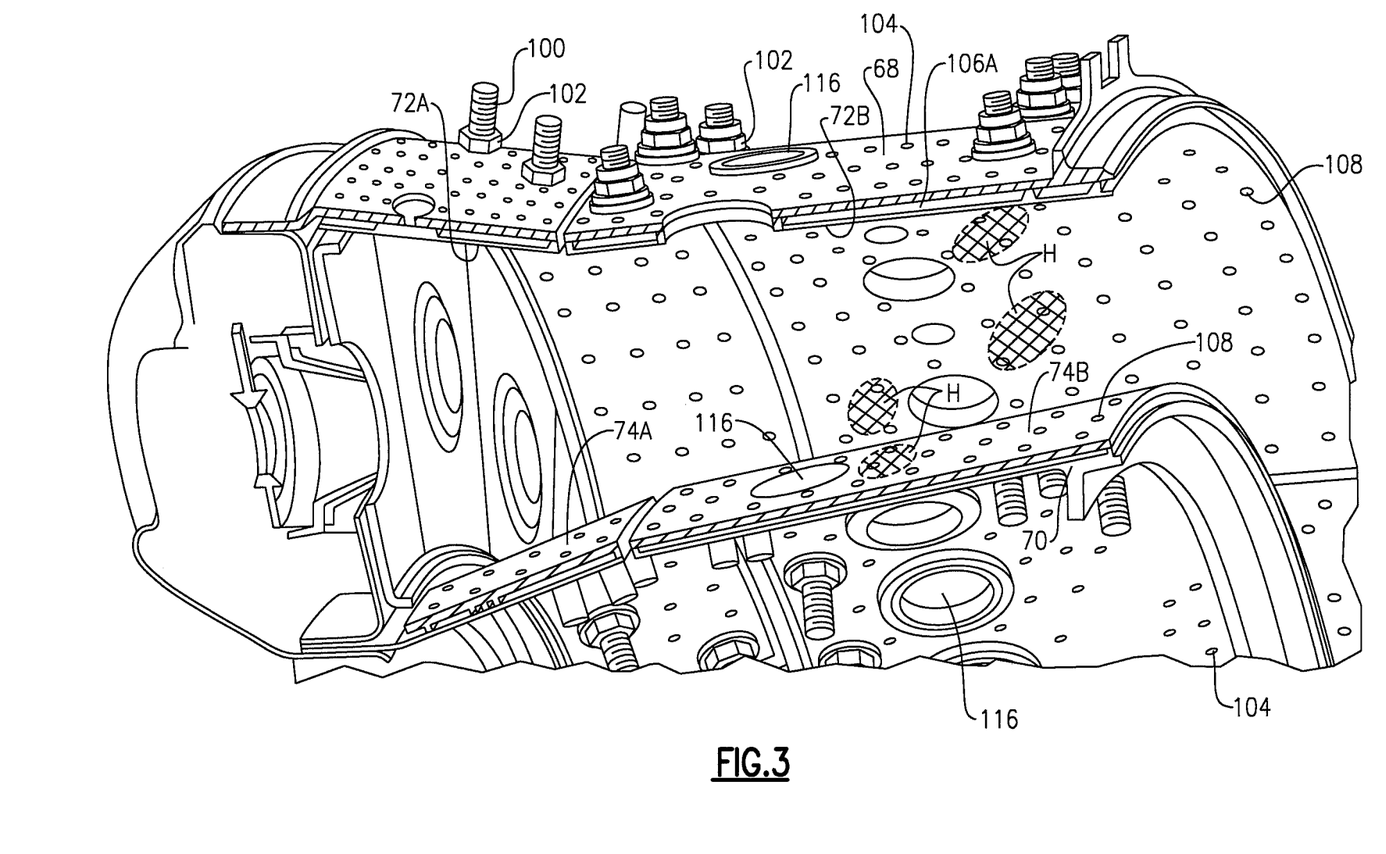
FIG. 3 is an expanded perspective sectional view of a combustor.

With reference to FIG. 3, a multiple of cooling impingement passages 104 penetrate through the support shells 68, 70 to allow air from the respective annular plenums 76, 78 to enter cavities 106A, 106B formed in the combustor liner assemblies 60, 62 between the respective support shells 68, 70 and heat shields 72, 74.

The cooling impingement passages 104 are generally normal to the surface of the heat shields 72, 74. The air in the cavities 106A, 106B provides backside impingement cooling of the heat shields 72, 74 that is generally defined herein as heat removal via internal convection.

A multiple of cooling film passages 108 penetrate through each of the heat shields 72, 74. The geometry of the film passages, e.g., diameter, shape, density, surface angle, incidence angle, etc., as well as the location of the passages with respect to the high temperature combustion flow also contributes to effusion film cooling. The combination of cooling impingement passages 104 and cooling film passages 108 within the respective support shells 68, 70 and heat shields 72, 74 may often be referred to as an Impingement Film Floatliner assembly.

A multiple of dilution apertures 116 penetrate through both the respective support shells 68, 70 and heat shields 72, 74 along a common axis. For example only, in a Rich-Quench-Lean (R-Q-L) type combustor, the dilution apertures 116 are located downstream of the forward assembly 80 to quench the combustion gases to supply cooling air into the combustor 56. It should be understood that other combustor types will also benefit herefrom.

The cooling film passages 108 allow the cooling air to pass from the cavities 106A, 106B defined in part by a cold side 110 of the heat shields 72, 74 to a hot side 112 of the heat shields 72, 74 and thereby facilitate the formation of a film of cooling air along the hot side 112. Rails 118 extend from a cold side 110 of each of the heat shields 72, 74 to form an edge 120 that at least partially defines the cavities 106A, 106B. It should be appreciated that various rails 118 may be provided to segregate, support and seal each of the heat shields 72, 74 on their respective support shells 68, 70. Furthermore, the rails 118 may segregate individual heat shields 72, 74.

The cooling film passages 108 are generally more numerous than the cooling impingement passages 104 to promote the development of a film cooling along the hot side 112 to sheath the heat shields 72, 74 on a combustion gas side. Film cooling as defined herein is the introduction of a relatively cooler airflow at one or more discrete locations along a surface exposed to a high temperature environment to protect that surface in the immediate region of the airflow injection as well as downstream thereof.

In some cases, local hot spots H may form on the heat shield 72, 74, or other panels within the combustor 56. Hot spots H often typically occur in about ten to twenty percent (10%-20%) of the surface area of the heat shields 72, 74. Oftentimes, a hot spot H forms downstream from each of the multiple of fuel nozzles 86 adjacent to the dilution holes 116, however other locations may also be subject to hot spot H formation. It should be appreciated that hot spot H location identification may be determined experimentally and/or analytically.

Figure 5:
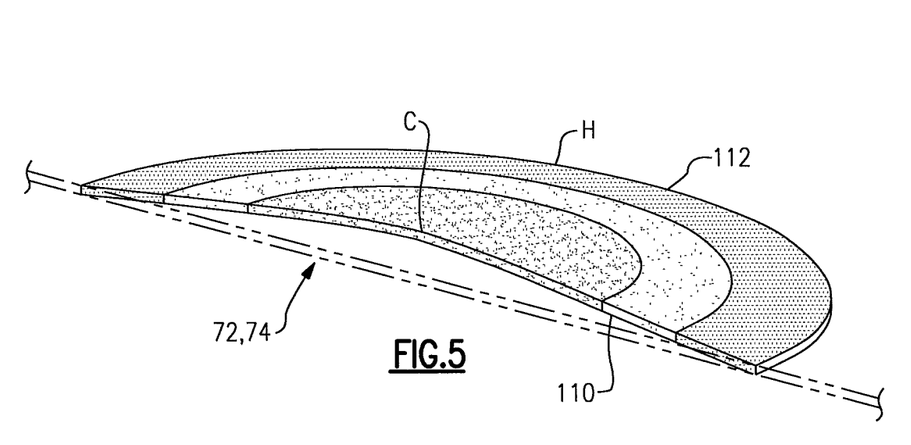
FIG. 5 is an expanded schematic view of an example variation in a hot spot blister height from center to an edge of the hot spot blister.
Figure 6:
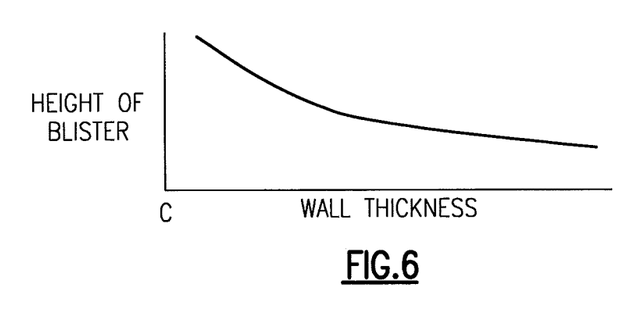
FIG. 6 is graphical representation of hot spot blister height with respect to a liner panel wall thickness.

Colder regions in the metal of the heat shields 72, 74, surround the hot spot H. Because the hot spot H is relatively localized, the thermal expansion causes a swelling and out of plane movement into the combustion chamber 66. An analytic model of a hot spot H which essentially form as blister with the predicted out of plane deformation at its center C is schematically illustrated in FIG. 5 while FIG. 6 schematically illustrates the relationship between the height of an example hot spot H blister versus wall thickness from the center C outward.

Figure 7:
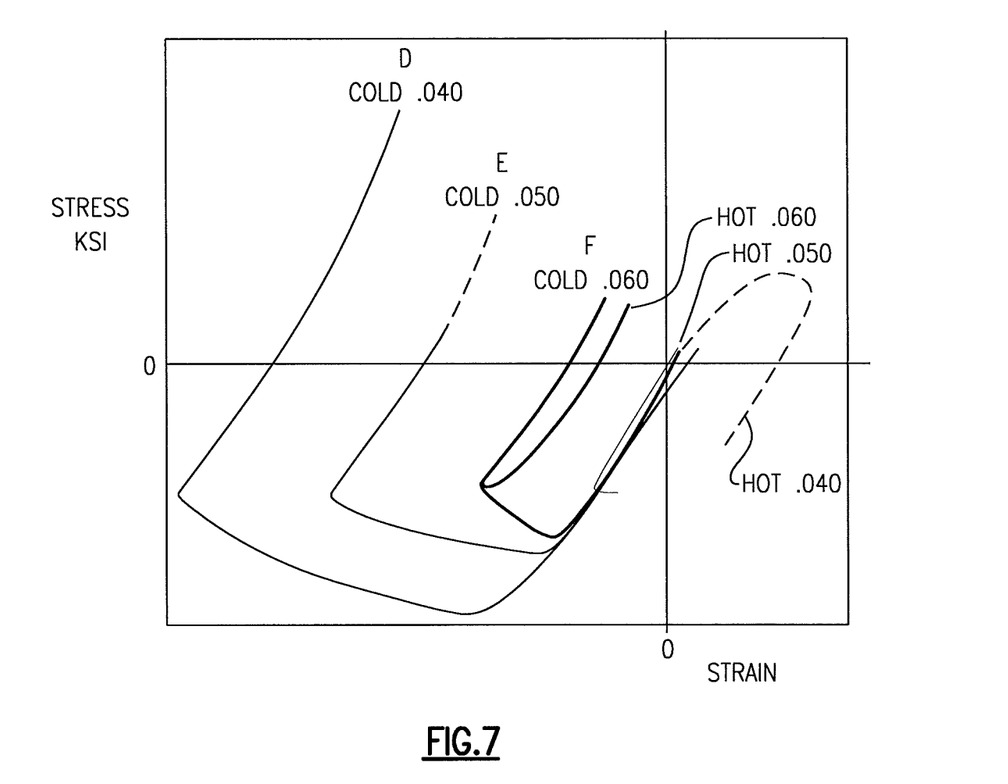
FIG. 7 is graphical representation of example various stress-strain curves for different wall thicknesses.

As the heat shield 72, 74 moves out of plane in the hot spot H, local bending stresses are formed through the thickness. Because of the geometry change, the stress becomes higher on the cold side 110 of the heat shield 72, 74. It is here where thermal fatigue cracks may initiate. The higher the hot spot H, the higher the local stress or strain. The predicted stress versus strain behavior for the hot side 112 and the cold side 110 of the hot spot H for three different wall thicknesses D, E, F are graphically represented in FIG. 7.

Figure 8:
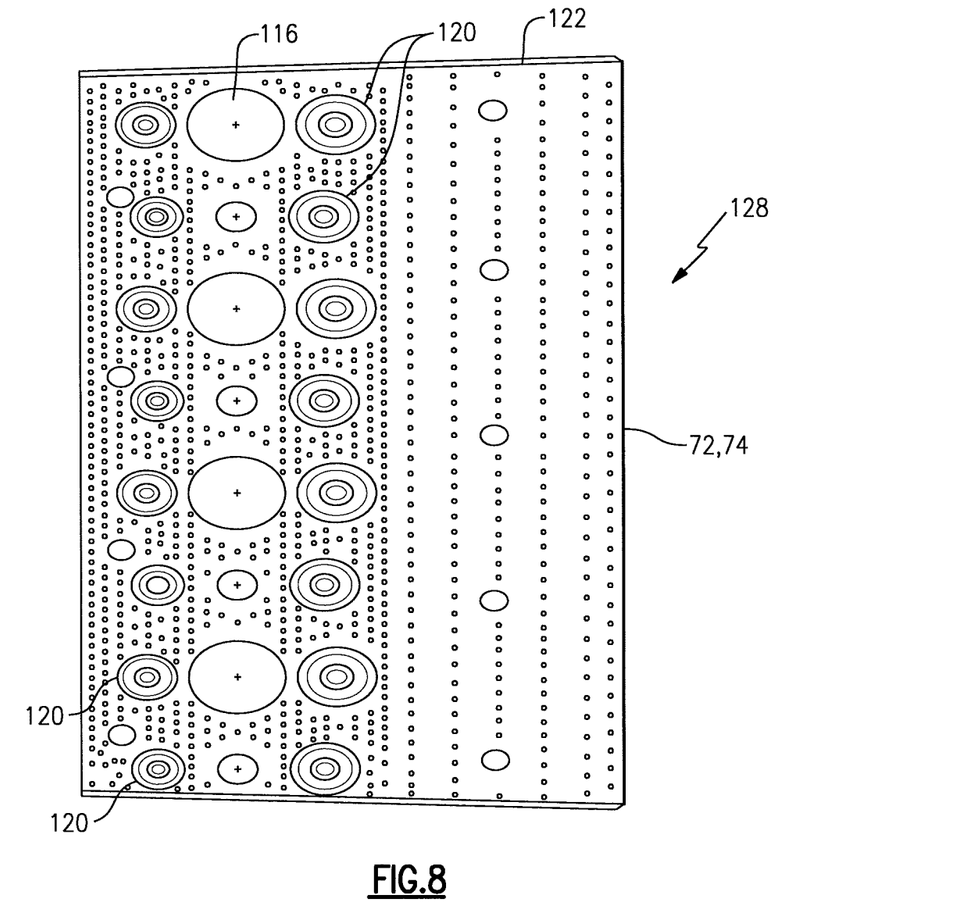
FIG. 8 is a perspective view of a heat shield illustrating example increased thickness areas.

With reference to FIG. 8, a thickened wall thickness 120 relative to a nominal wall thickness 122 is located in the heat shield 72, 74 at each predetermined area where a hot spot H is located. It should be appreciated that the heat shield 72, 74 is representative of various liner panels 124 exposed to the combustion chamber 66 (FIG. 2) such as a single wall, dual wall or other combustor 56.

Figure 9:
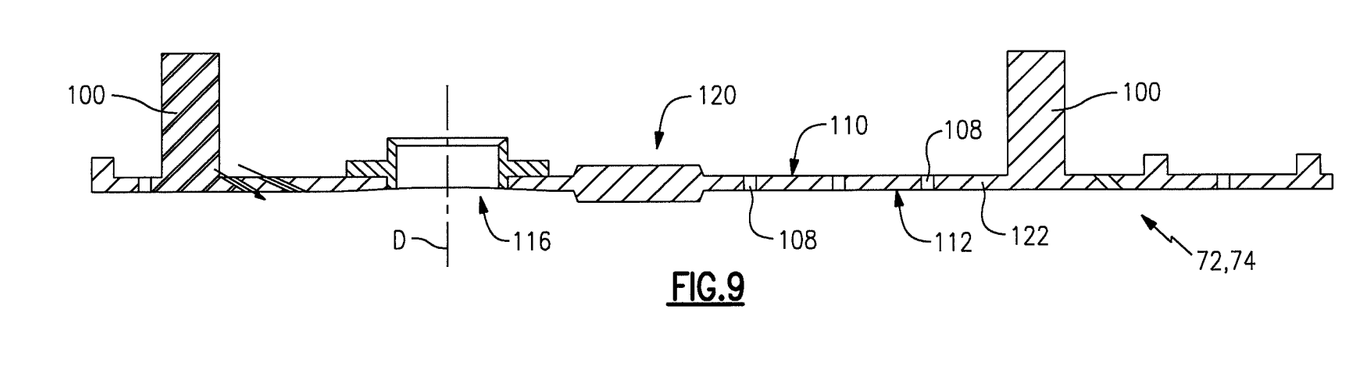
FIG. 9 is a sectional view of a heat shield with increased thickness areas according to one non-limiting embodiment.

The thickened wall thickness 120 impedes the out of plane movement (FIG. 5) and reduces the increase in stress due to the bending component. In one disclosed non-limiting embodiment, a relatively modest increase in thickness from, for example 40 mils (0.04"; 1 mm) to 60 mils (0.06"; 1.5 mm) has a dramatic effect on both the stress and stress range (or strain and strain range) of the material at the hot spot H. The thickened wall thickness 120 may be accomplished on the cold side 110, hot side 112 or both (FIG. 9). Wall thickness outside of the hot spot H remains at the, for example, nominal 40 mils (0.04"; 1 mm). It should be appreciated that other thickness increases within the thickened wall thickness 120 may alternatively be provided.

In one disclosed non-limiting embodiment, the thickened wall thickness 120 is located in the heat shield 72, 74 adjacent to a respective dilution hole 116 either forward of the dilution hole 116, aft of the dilution hole 116 or both forward and aft of the dilution hole 116.

Each thickened wall thickness 120 may be associated with single dilution one or multiple of dilution holes 116. In cross-section, the thickened wall thickness 120 may be step-shaped (FIG. 9), ramped (FIG. 10), or of other geometry.

The thickened wall thickness 120 is shaped to generally conform to the hot spot H shape. That is, the thickened wall thickness 120 at least partially includes the hot spot H shape but need not exactly follow the profile of the hot spot H. In one disclosed non-limiting embodiment, the thickened wall thickness is generally egg-shaped with the larger area of the egg-shape directed toward the dilution hole 116. It should be appreciated that other orientations may be utilized.

Figure 10:
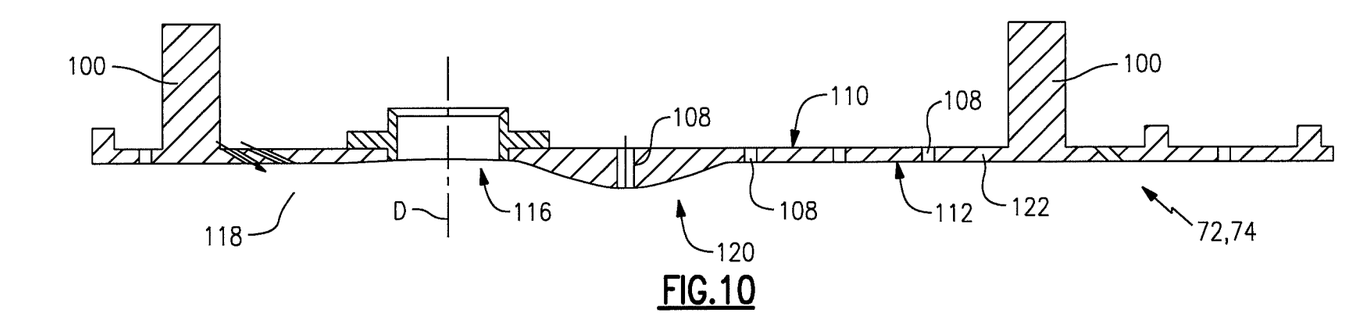
FIG. 10 is a sectional view of a heat shield with increased thickness areas according to another non-limiting embodiment.

With reference to FIG. 10, each or particular thickened wall thickness 120 may incorporate cooling film holes 108 to increase the film effectiveness if required by the specific design configuration. The cooling film holes 108 may also be oriented at an angle or normal to the hot side 112.

The thickened wall thickness 120 lowers stress and increases durability of the heat shield 72, 74 with minimal change to the heat shield 72, 74. The thickened wall thickness 120 also provides a higher oxidation life since there is more material present and is readily retrofit to current panel designs. The thickened wall thickness 120 may be readily manufactured with additive manufacturing technologies such as 3D printing or laser deposition.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of increasing a durability of a heat shield of a combustor of a gas turbine engine comprising:
   providing the combustor comprising:
   a support shell; and
   a heat shield mounted to the support shell, the heat shield having a first wall thickness,
   identifying a hot spot location of the heat shield; and
   providing a second wall thickness to at least partially overlap with the hot spot location,
   wherein the second wall thickness is greater than the first wall thickness, and wherein said second wall thickness is egg-shaped,
   wherein the heat shield includes a hot side that interfaces to a combustion chamber of the combustor and a cold side that is opposed to the hot side, and wherein said second wall thickness extends towards the combustion chamber relative to the first wall thickness on the hot side, and wherein said second wall thickness extends away from the combustion chamber relative to the first wall thickness on the cold side, wherein said second wall thickness includes a film cooling hole therethrough, and wherein the second wall thickness has a ramped cross-sectional shape on the hot side, and
   wherein said second wall thickness is adjacent to a dilution hole through said heat shield, and
   wherein a larger end of the egg-shaped second wall thickness is directed toward the dilution hole.

2. The method as recited in claim 1, wherein said second wall thickness is generally forward of the dilution hole.

3. The method as recited in claim 1, wherein said second wall thickness is aft of said dilution hole.

4. A method of increasing durability of a liner panel in a combustor of a gas turbine engine, comprising:
   providing a support shell mounted to the liner panel; and
   identifying a hot spot location of the liner panel, and thickening a first wall thickness of the liner panel, defined between a hot side and a cold side of the liner panel, to define a second wall thickness, the second wall thickness comprising a first portion extending outward from the hot side and a second portion extending outward from the cold side opposite the first portion, wherein said second wall thickness includes a film cooling hole therethrough, and wherein said first portion and said second portion of said second wall thickness are egg-shaped to at least partially overlap with the hot spot location of the liner panel.

5. The method as recited in claim 4, further comprising: locating the second wall thickness proximate a dilution hole.

6. The method as recited in claim 5, further comprising: directing airflow through the second wall thickness toward the dilution hole.

7. The method of claim 4, wherein the support shell is a radially outer support shell of the combustor, the combustor further comprising a radially inner support shell and a combustion chamber defined between the radially outer support shell and the radially inner support shell.

8. The method as recited in claim 5, wherein said second wall thickness is forward of said dilution hole.

9. The method as recited in claim 5, wherein said second wall thickness is aft of said dilution hole.

\* \* \* \* \*